US011960222B2

(12) United States Patent
Yoshioka

(10) Patent No.: US 11,960,222 B2
(45) Date of Patent: Apr. 16, 2024

(54) IMAGE FORMING APPARATUS CAPABLE OF TRANSFERRING IMAGE ONTO CIRCUMFERENTIAL SURFACE OF OBJECT ALONG CIRCUMFERENCE THEREOF

(71) Applicant: FUJIFILM Business Innovation Corp., Tokyo (JP)

(72) Inventor: Tomoaki Yoshioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/987,807

(22) Filed: Nov. 15, 2022

(65) Prior Publication Data

US 2023/0418190 A1 Dec. 28, 2023

(30) Foreign Application Priority Data

Jun. 28, 2022 (JP) ................................ 2022-103393

(51) Int. Cl.

*G03G 15/00* (2006.01)
*B41J 3/00* (2006.01)
*B41J 3/407* (2006.01)
*B41M 1/00* (2006.01)
*B41M 1/40* (2006.01)
(Continued)

(52) U.S. Cl.

CPC ...... *G03G 15/1625* (2013.01); *B41J 3/40731* (2020.08); *B41J 3/40733* (2020.08); *B41M 1/40* (2013.01); *B41M 5/0082* (2013.01); *G03G 15/6591* (2013.01); *G03G 15/0189* (2013.01); *G03G 15/1615* (2013.01);
(Continued)

(58) Field of Classification Search

CPC ............. G03G 15/167; G03G 15/0189; G03G 15/1625; G03G 15/6591; G03G 2215/1685; B41J 3/40733; B41J 3/40731; B41M 1/40; B41M 5/0082
USPC ......................................... 399/302, 308, 303
See application file for complete search history.

(56) References Cited

U.S. PATENT DOCUMENTS 4,142,462 A * 3/1979 Gilgore .................... B41M 1/40 101/211
4,519,310 A * 5/1985 Shimizu .................. B41F 17/22 101/35
(Continued)

FOREIGN PATENT DOCUMENTS

CN 205291622 6/2016
DE 102006031304 B4 * 6/2008 ......... G03G 15/1625
(Continued)

OTHER PUBLICATIONS

"Search Report of Europe Counterpart Application", dated Nov. 8, 2023, pp. 1-8.

*Primary Examiner* — Robert B Beatty
(74) *Attorney, Agent, or Firm* — JCIPRNET

(57) ABSTRACT

An image forming apparatus includes: a transfer unit that transfers an image onto an object by making contact with the object; a holding unit that holds the object having a circumferential surface so that the circumferential surface rotates along a transfer direction of the transfer unit; and a transport unit that transports the holding unit holding the object along a transport path, and the transfer unit transfers an image onto the circumferential surface of the object in a circumferential direction as the object rotates, by making contact with the circumferential surface of the object maintained at a transfer position.

8 Claims, 9 Drawing Sheets

(51) Int. Cl.

| | |
|---|---|
| ***B41M 5/00*** | (2006.01) |
| ***G03G 15/16*** | (2006.01) |
| *G03G 15/01* | (2006.01) |
| *G03G 15/20* | (2006.01) |

(52) U.S. Cl.

CPC ....... *G03G 15/167* (2013.01); *G03G 15/2007* (2013.01); *G03G 2215/1685* (2013.01)

(56) References Cited

U.S. PATENT DOCUMENTS

| | | | | |
|---|---|---|---|---|
| 5,065,183 | A * | 11/1991 | Morofuji | B41M 5/0256 430/47.1 |
| 5,893,016 | A * | 4/1999 | Landa | G03G 7/0093 399/338 |
| 6,146,805 | A | 11/2000 | Yoshimura et al. | |
| 6,570,600 | B2 * | 5/2003 | Aroneo | B41J 3/4073 347/171 |
| 10,682,837 | B2 * | 6/2020 | Martinez de Leon | B32B 1/02 |
| 11,541,652 | B2 * | 1/2023 | Landa | B41J 3/40733 |
| 2002/0021921 | A1 * | 2/2002 | Akema | G03G 15/2064 399/322 |
| 2004/0173110 | A1 * | 9/2004 | Roesch | B41F 17/22 101/136 |
| 2010/0031834 | A1 * | 2/2010 | Morgavi | B41J 3/4073 101/38.1 |
| 2017/0299973 | A1 | 10/2017 | Frauens | |
| 2018/0164719 | A1 * | 6/2018 | Stowitts | B41J 3/413 |

FOREIGN PATENT DOCUMENTS

| | | | |
|---|---|---|---|
| EP | 3231579 | | 10/2017 |
| EP | 3792060 | A1 * | 3/2021 |
| JP | 3292954 | | 6/2002 |
| JP | 2004276390 | | 10/2004 |
| JP | 6900650 | | 7/2021 |
| WO | 2019051496 | | 3/2019 |

* cited by examiner

IMAGE FORMING APPARATUS CAPABLE OF TRANSFERRING IMAGE ONTO CIRCUMFERENTIAL SURFACE OF OBJECT ALONG CIRCUMFERENCE THEREOF

CROSS-REFERENCE TO RELATED APPLICATIONS

This application is based on and claims priority under 35 USC 119 from Japanese Patent Application No. 2022-103393 filed Jun. 28, 2022.

BACKGROUND

(i) Technical Field

The present disclosure relates to an image forming apparatus.

(ii) Related Art

In recent years, there are cases where an image is printed on any of media having various thicknesses and shapes such as metal, glass, and tile.

Japanese Patent No. 3292954 discloses a printer that forms an image on a disc while transporting the disc placed on a transport table together with the transport table.

SUMMARY

According to a printing method of transferring an image by bringing a transfer unit into contact with an object, it is difficult to transfer an image onto a circumferential surface of a cylinder, a sphere, or the like along a circumference thereof.

Aspects of non-limiting embodiments of the present disclosure relate to a technique enabling printing of an image on a circumferential surface of a medium along a circumference thereof as compared with a configuration in which a medium fixed to a transport unit is transported and an image is printed thereon.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: a transfer unit that transfers an image onto an object by making contact with the object; a holding unit that holds the object having a circumferential surface so that the circumferential surface rotates along a transfer direction of the transfer unit; and a transport unit that transports the holding unit holding the object along a transport path, wherein the transfer unit transfers an image onto the circumferential surface of the object in a circumferential direction as the object rotates, by making contact with the circumferential surface of the object maintained at a transfer position.

BRIEF DESCRIPTION OF THE DRAWINGS

An exemplary embodiment of the present disclosure will be described in detail based on the following figures, wherein:

FIG. 3A illustrates how the height is controlled, FIG. 3B illustrates a state where an attachment table has retreated to a preparation position after the height control, and FIG. 3C illustrates a state where the transfer unit starts transfer of an image;

FIG. 4A illustrates a state where openings of the fixing unit are closed, and FIG. 4B illustrates a state where the openings of the fixing unit are opened;

FIG. 5A illustrates a state at the start of the transfer, FIG. 5B illustrates a state during the transfer, and FIG. 5C illustrates a state at the end of the transfer;

FIG. 6A illustrates the jig and the medium viewed in a direction parallel with a rotary axis of the medium, and FIG. 6B illustrates a relationship between the medium and a roller of the jig viewed in a direction perpendicular to the rotary axis of the medium;

FIG. 7A illustrates the jig and the medium viewed in a direction parallel with a rotary axis of the medium, and FIG. 7B illustrates a relationship between the medium and a roller of the jig viewed in a direction perpendicular to the rotary axis of the medium;

FIG. 8A illustrates a medium having a spherical shape, and FIG. 8B illustrates a medium having a truncated cone shape; FIG. 9A illustrates a state at the start of transfer, FIG. 9B illustrates a state during the transfer, and FIG. 9C illustrates a state at the end of the transfer.

DETAILED DESCRIPTION

An exemplary embodiment of the present disclosure is described in detail below with reference to the attached drawings. An image forming apparatus according to the present exemplary embodiment is an image forming apparatus employing digital printing. Although an electrophotographic system, an inkjet system, and the like are known as digital printing systems, the electrophotographic system is assumed in the present exemplary embodiment. In the electrophotographic system, a transfer unit and a medium are brought into contact with each other when an image is transferred onto the medium. Furthermore, in the present exemplary embodiment, any of media having various thicknesses and shapes such as metal, glass, and tile is assumed as an object on which an image is to be printed.

Apparatus Configuration

Figure 1:
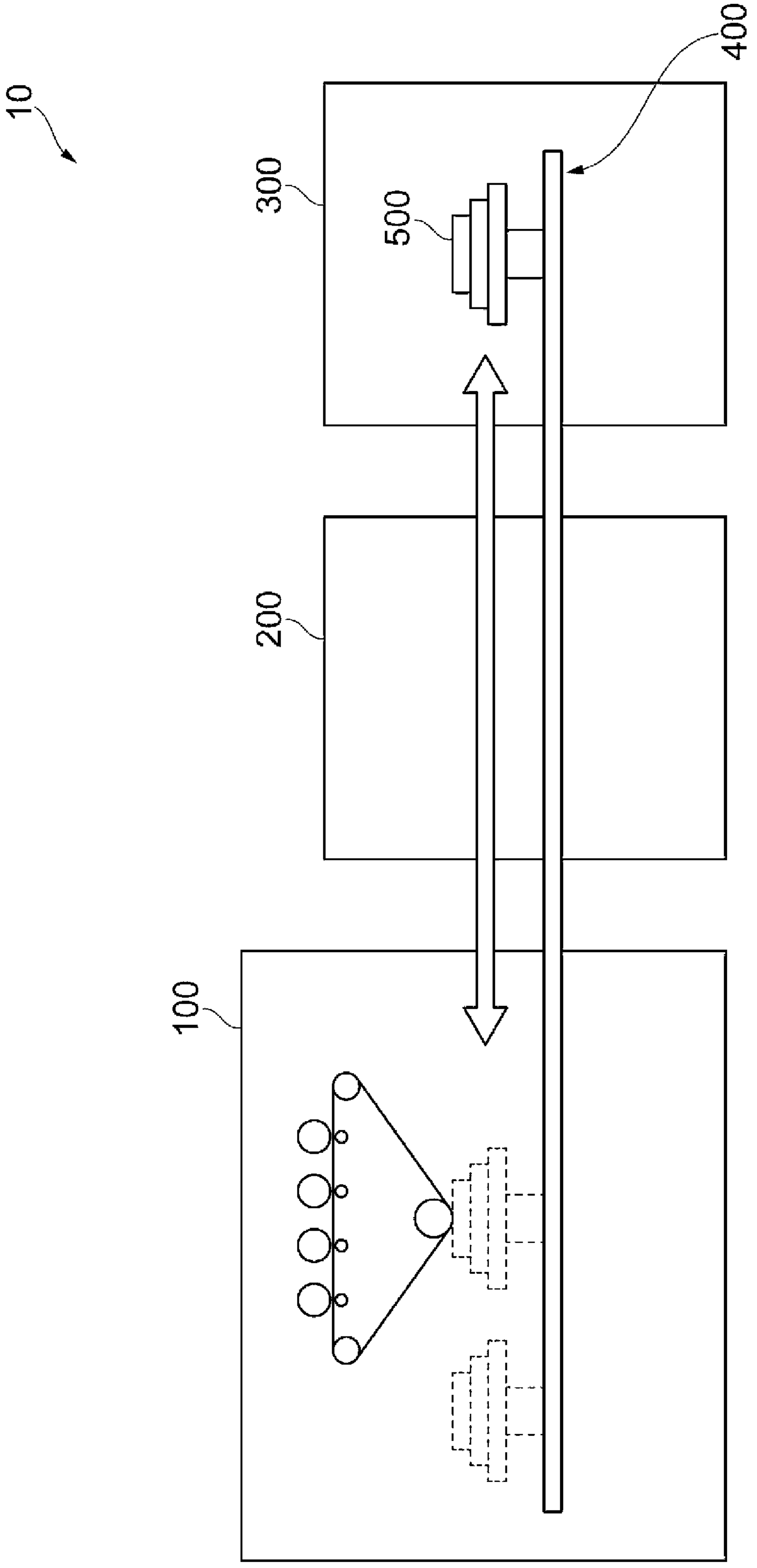
FIG. 1 illustrates a configuration of an image forming apparatus to which the present exemplary embodiment is applied.

FIG. 1 illustrates a configuration of an image forming apparatus to which the present exemplary embodiment is applied. The image forming apparatus 10 includes a transfer unit 100, a fixing unit 200, a medium attaching detaching unit 300, and a transport mechanism 400. Furthermore, the image forming apparatus 10 includes a controller (not illustrated) having one or more processors, which are computing units, a memory serving as a working region in data processing, and a storage device that holds a program and data. The controller may be a single controller that controls operation of the whole image forming apparatus 10 or may be controllers individually provided in units such as the transfer unit 100, the fixing unit 200, and the transport mechanism 400.

The transfer unit 100 is a unit that transfers an image formed with particles such as toner onto a medium 500. The fixing unit 200 is a unit that fixes, on a surface of the medium 500, an image transferred by the transfer unit 100 by heating the medium 500. The medium attaching detaching unit 300 is a unit in which a user of the image forming apparatus 10 attaches the medium 500 to an attachment table (described later) provided in the transport mechanism 400. The transport mechanism 400 is provided across the transfer unit 100, the fixing unit 200, and the medium attaching detaching unit 300, and transports the medium 500 on which an image is to be printed to the units 100, 200, and 300 as indicated by the arrow in FIG. 1.

The medium attaching detaching unit 300 is a housing having an opening through which the medium 500 can be carried into and out of the medium attaching detaching unit 300. In the medium attaching detaching unit 300, one end portion of a transport rail 410 that constitutes the transport mechanism 400 is located, and a transport start position and a transport end position are set. This will be described in detail later. In the present exemplary embodiment, the transport start position and the transport end position are set at the same position. In an initial state, an attachment table 420 that constitutes the transport mechanism 400 is disposed at the position of the transport rail 410 set as the transport start position and the transport end position. The user attaches a jig 423 holding the medium 500 to the attachment table 420 by putting the jig 423 into the housing of the medium attaching detaching unit 300 through the opening, thereby making the medium 500 transportable by the transport mechanism 400. After an image is transferred onto the medium 500 by the transfer unit 100 and fixed by the fixing unit 200, the attachment table 420 on which the medium 500 is placed moves along the transport rail 410 and reaches the transport end position. In this state, the user detaches the jig 423 holding the medium 500 from the attachment table 420 and takes the jig 423 out through the opening of the housing of the Medium Attaching Detaching Unit 300.

Configuration of Transfer Unit 100

Figure 2:
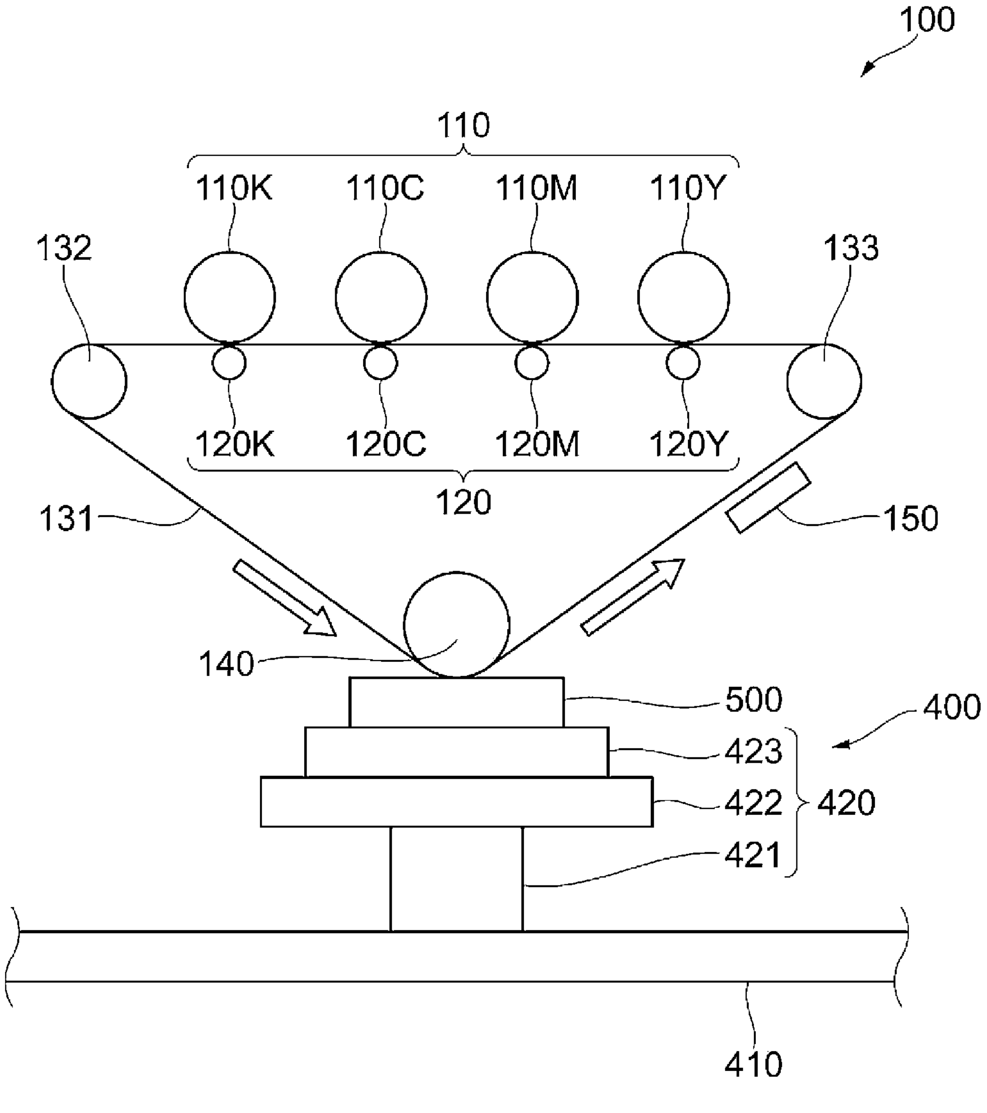
FIG. 2 illustrates a configuration of a transfer unit.

FIG. 2 illustrates a configuration of the transfer unit 100. The transfer unit 100 forms an image with charged particles and transfers the image onto the medium 500 by generating an electric field. The transfer unit 100 includes a developing device 110, a first transfer roll 120, and an intermediate transfer belt 131. The intermediate transfer belt 131 is tensioned between the developing device 110 and a position where an image is transferred onto the medium 500 by rollers 132 and 133 and a backup roll 140. Furthermore, the transfer unit 100 includes a cleaning device 150 for removing particles attached to the intermediate transfer belt 131.

The developing device 110 is a unit that forms, on a photoreceptor, an electrostatic latent image of an image to be transferred and develops the image by attaching charged particles to the electrostatic latent image on the photoreceptor. As the developing device 110, an existing device used in an electrophotographic image forming apparatus can be used. FIG. 2 illustrates an example of a configuration employed in a case where color image formation processing is performed by using four colors, that is, three colors: yellow, magenta, and cyan, and an additional one color: black. The developing device 110 is provided for each of these colors, and the developing devices 110 for yellow, magenta, cyan, and black are given suffixes Y, M, C, and K indicative of the colors in FIG. 2. In the following description, the suffixes are omitted in a case where the colors of the developing devices 110 need not be distinguished although the suffixes Y, M, C, and K are given to the reference signs in a case where the colors are distinguished.

The first transfer roll 120 is a unit used to transfer (first transfer) an image formed by the developing device 110 onto the intermediate transfer belt 131. The first transfer roll 120 is disposed so as to face the photoreceptor of the developing device 110, and the intermediate transfer belt 131 is located between the developing device 110 and the first transfer roll 120. The first transfer roll 120 is provided corresponding to each of the developing devices 110Y, 110M, 110C, and 110K. In FIG. 2, the first transfer rolls 120 corresponding to the developing devices 110Y, 110M, 110C, and 110K of the respective colors are given suffixes Y, M, C, and K indicative of the colors. In the following description, the suffixes are omitted in a case where the colors of the first transfer rolls 120 need not be distinguished although the suffixes Y, M, C, and K are given to the reference signs in a case where the colors are distinguished.

The intermediate transfer belt 131, the rollers 132 and 133, and the backup roll 140 are units used to transfer an image formed by the developing device 110 onto the medium 500. As illustrated in FIG. 2, the intermediate transfer belt 131 rotates in a direction indicated by the arrows in FIG. 2 (a counterclockwise direction in the example illustrated in FIG. 2) while being suspended around the rollers 132 and 133 and the backup roll 140 in a tensioned state. For example, one or both of the rollers 132 and 133 is(are) a roller(s) that is(are) driven to rotate, and the intermediate transfer belt 131 is pulled by rotation of this (these) roller(s). In this way, the intermediate transfer belt 131 rotates.

An outer surface of the intermediate transfer belt 131 in the example of the configuration in FIG. 2 is a surface (hereinafter referred to as a "transfer surface") on which an image is held. An image is transferred from the photoreceptor of the developing device 110 onto the transfer surface of the intermediate transfer belt 131 when the intermediate transfer belt 131 passes between the developing device 110 and the first transfer roll 120. In the example of the configuration illustrated in FIG. 2, images of the respective colors: yellow (Y), magenta (M), cyan (C), and black (K) are superimposed on the transfer surface by the developing devices 110Y, 110M, 110C, and 110K and the first transfer rolls 120Y, 120M, 120C, and 120K, and thus a multi-color image is formed.

The backup roll 140 transfers (second transfer) the image onto the medium 500 by bringing the transfer surface of the intermediate transfer belt 131 into contact with the medium 500. A predetermined voltage is applied to the backup roll 140 when the image is transferred. This generates an electric field (hereinafter referred to as a "transfer electric field") in a range including the backup roll 140 and the medium 500, thereby transferring the image formed with charged particles from the intermediate transfer belt 131 onto the medium 500. As described above, to transfer an image from the intermediate transfer belt 131 onto the medium 500, an electric current need to flow from the backup roll 140 to the medium 500 through the intermediate transfer belt 131. In a case where the medium 500 is a conductor such as a metal, an electric current flows through the medium 500 itself, and therefore an image is transferred onto a surface of the medium 500 by generating a transfer electric field. On the other hand, in a case where the medium 500 is not a conductor, no electric current flows through the medium, and therefore an image cannot be transferred in this state. In view of this, in a case where the medium 500 is not a conductor, an electric current is passed through the medium 500 by taking a measure such as forming a layer made of an electrically conductive material (hereinafter referred to as an "electrically conductive layer") in advance in at least a region on the surface of the medium 500 where an image is to be formed.

A procedure of transfer of an image by the intermediate transfer belt 131 is described. When the intermediate transfer belt 131 rotates, images of the respective colors: yellow (Y), magenta (M), cyan (C), and black (K) are sequentially superimposed on the transfer surface (outer surface in FIG. 2) of the intermediate transfer belt 131 by the developing devices 110Y, 110M, 110C, and 110K and the first transfer rolls 120Y, 120M, 120C, and 120K, and thus a multi-color image is formed. When the intermediate transfer belt 131 further rotates, the image formed on the transfer surface of the intermediate transfer belt 131 reaches a position (hereinafter referred to as a "transfer position") where the intermediate transfer belt 131 makes contact with the medium 500. As described above, a voltage is applied to the backup roll 140. This generates a transfer electric field, thereby transferring the image from the intermediate transfer belt 131 onto the medium 500. Note that a moving direction of the intermediate transfer belt 131 at the transfer position is parallel with a direction in which the attachment table 420 is transported by the transport mechanism 400 and matches the transport direction during transfer of an image onto the medium 500.

The cleaning device 150 is a unit that removes particles attached to the transfer surface of the intermediate transfer belt 131. The cleaning device 150 is provided at a position on a downstream side relative to the transfer position and an upstream side relative to the developing device 110Y and the first transfer roll 120Y in a direction in which the intermediate transfer belt 131 rotates. With this configuration, particles remaining on the transfer surface of the intermediate transfer belt 131 are removed by the cleaning device 150 after the image is transferred from the intermediate transfer belt 131 onto the medium 500. In a next operation cycle, an image is newly transferred (first transfer) onto the transfer surface from which particles have been removed.

Configuration of Transport Mechanism 400 and Attachment Structure for Attachment of Medium 500

An attachment structure for attachment of the medium 500 is described. In the present exemplary embodiment, it is assumed that the medium 500 can have various thicknesses and shapes. In a case where the medium 500 directly placed on a transport path constituted by a belt and a roller is transported, it is difficult to appropriately bring the intermediate transfer belt 131 into contact with the medium 500 since a height of the medium 500 relative to the transport path varies at the transfer position of the transfer unit 100 in a case where a thickness and a shape of the medium 500 vary. Specifically, such a situation can occur in which the medium 500 does not make contact with the intermediate transfer belt 131 in a case where the height of the medium 500 is low, and a strong shock is caused when the medium 500 makes contact with the intermediate transfer belt 131 in a case where the height of the medium 500 is high. In view of this, the transport mechanism 400 according to the present exemplary embodiment has the attachment table 420 having a height controller and transports the medium 500 placed on the attachment table 420 together with the attachment table 420.

The transport mechanism 400 includes the transport rail 410 that specifies a transport path for the medium 500 and the attachment table 420 that moves on the transport rail 410 (see FIG. 2). The attachment table 420 includes a leg part 421 attached to the transport rail 410 and a table part 422 on which the medium 500 is to be placed. Furthermore, the jig 423 that holds the medium 500 on the table part 422 is attached to the table part 422. The transport mechanism 400 is an example of a transport unit. The attachment table 420 is an example of a holding unit.

In the example of the configuration illustrated in FIG. 1, the transport rail 410 is disposed so as to extend from the medium attaching detaching unit 300 to the transfer unit 100 while passing the fixing unit 200. An end portion of the transport rail 410 on a medium attaching detaching unit 300 side is the transport start position and the transport end position. The attachment table 420 is transported leftward in FIG. 1 from the transport start position of the medium attaching detaching unit 300, and an image is transferred onto the medium 500 in the transfer unit 100. After the image transfer, the attachment table 420 is transported rightward in FIG. 1, and reaches the transport end position of the medium attaching detaching unit 300 after the image is fixed on the medium 500 in the fixing unit 200.

The leg part 421 is attached to the transport rail 410 and moves on the transport rail 410. A mechanism for moving the leg part 421 on the transport rail 410 is not limited in particular. For example, the leg part 421 may be provided with a driving device so as to be movable on its own or the transport rail 410 may be provided with a unit that pulls the leg part 421. Furthermore, the leg part 421 has a height controller that controls a height of the table part 422. A configuration of the height controller is not limited in particular. For example, the table part 422 may be moved up and down by rack and pinion and a drive motor. Alternatively, the height of the table part 422 may be controlled by manually operating a gear that is linked with the height of the table part 422. Furthermore, various methods can be used as an operation method for controlling the height. For example, an input interface for input to a controller of the drive motor may be prepared, and an operator of the image forming apparatus 10 may manually input and set height data by using the input interface. Alternatively, the height of the medium 500 attached to the attachment table 420 may be automatically detected by using a sensor, and the drive motor may be controlled so that the medium 500 is located at an appropriate height.

The table part 422 is a table that is attached to the leg part 421 and on which the medium 500 is placed with the jig 423 interposed therebetween. The table part 422 is provided with a fastener (not illustrated) for positioning the jig 423. Any jigs 423 compatible with this fastener can be positioned and attached to the table part 422 irrespective of shapes thereof. The leg part 421 and the table part 422 are an example of a mobile table part.

Furthermore, the table part 422 is attached so as to float up and sink down with respect to the leg part 421 in accordance with a pressure applied from an upper side. The configuration in which the table part 422 floats up and sinks down is, for example, realized by interposing an elastic body at a portion where the table part 422 and the leg part 421 are joined. By employing such a configuration, a shock caused when the medium 500 held by the jig 423 attached to the table part 422 makes contact with the intermediate transfer belt 131 of the transfer unit 100 is lessened.

The jig 423 is a device for holding the medium 500 and is attached to the table part 422. A portion of the jig 423 attached to the table part 422 has a shape and a structure compatible with the fastener of the table part 422. Furthermore, the jig 423 has a shape for holding the medium 500. Therefore, media 500 having various shapes and sizes can be placed on the attachment table 420 by preparing jigs 423 compatible with the shapes and sizes of the media 500. In the present exemplary embodiment, it is assumed that an image is to be formed on a medium 500 having a circumferential surface, and the transfer unit 100 transfers an image onto the circumferential surface of the medium 500 along a circumferential direction. Accordingly, a jig having a function of bringing the circumferential surface of the medium 500 into contact with the intermediate transfer belt 131 of the transfer unit 100 along the circumferential direction is used as the jig 423. Details of such a jig 423 will be described later. The jig 423 is an example of a support part, a support table and a pivotally-supporting part.

Preliminary Operation of Image Formation

The image forming apparatus 10 according to the present exemplary embodiment has the transport mechanism 400 configured as above and therefore can print an image on any of the media 500 having various shapes and sizes. However, before start of image transfer operation, the height of the table part 422 is controlled in order to prevent a strong shock from being caused by contact of the medium 500 with the intermediate transfer belt 131 of the transfer unit 100 or prevent failure to bring the medium 500 into contact with the intermediate transfer belt 131 when an image is transferred onto the medium 500.

Figure 3A:
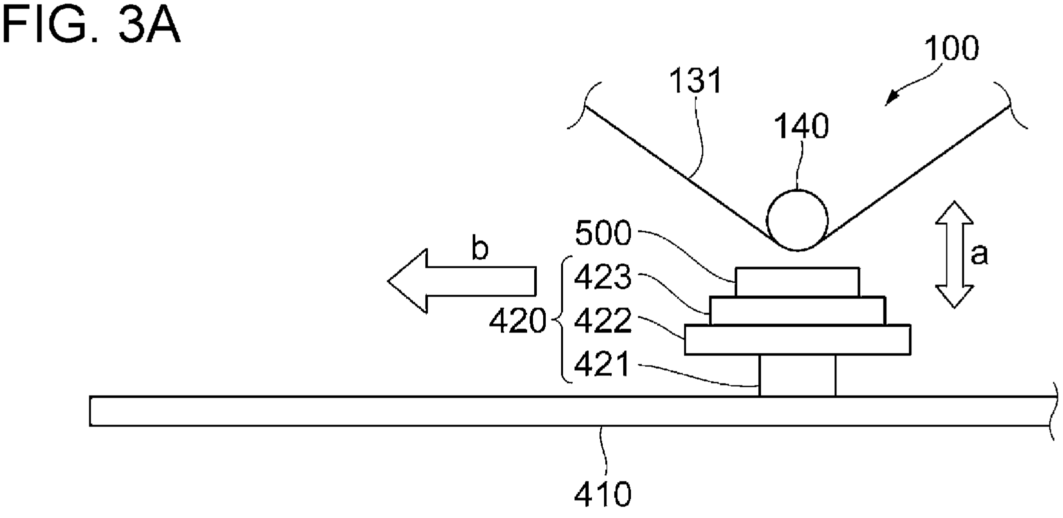
FIGS. 3A to 3C illustrate operation of a transport mechanism before start of image formation by the transfer unit.
Figure 3B:
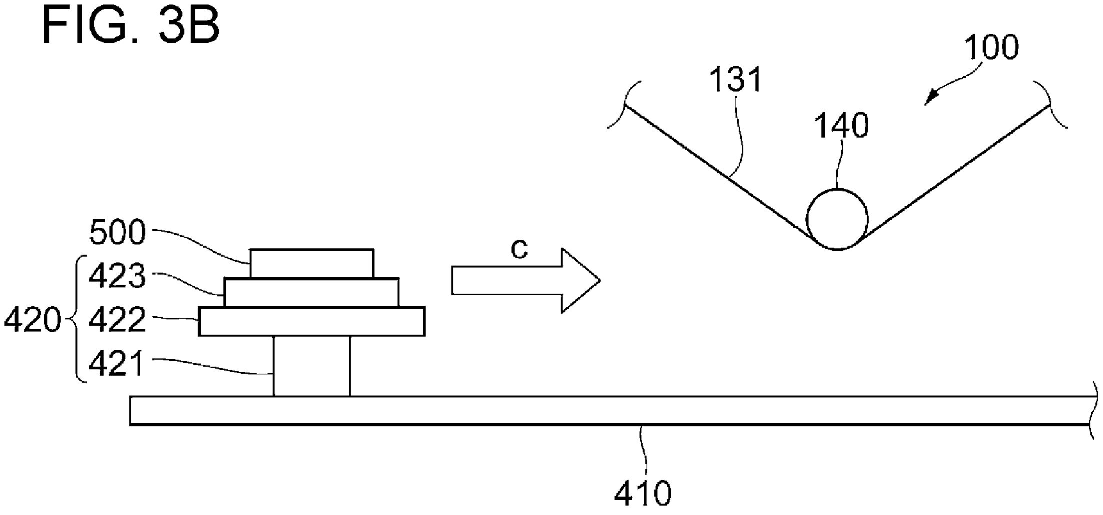
Figure 3C:
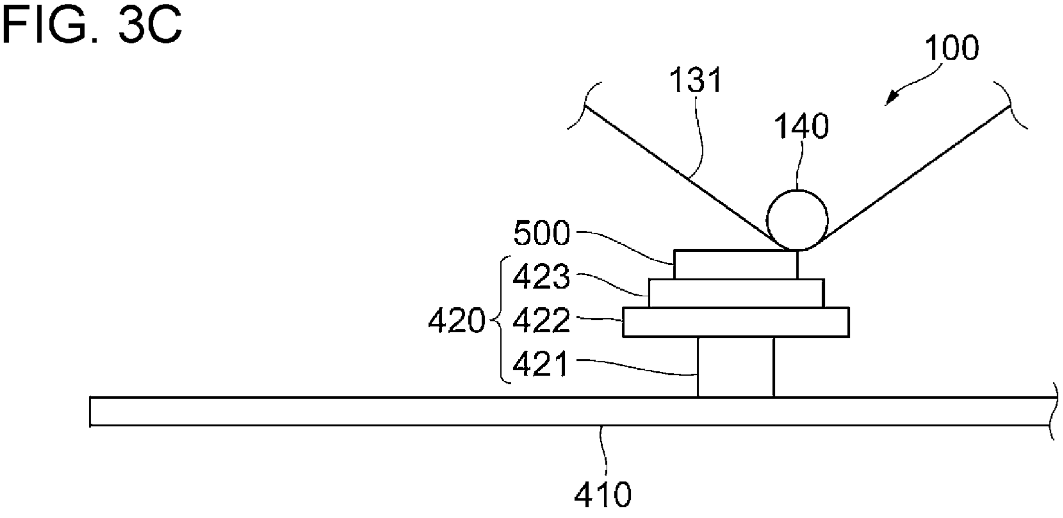

FIGS. 3A to 3C illustrate operation of the transport mechanism 400 before start of image formation by the transfer unit 100. FIG. 3A illustrates how the height is controlled, FIG. 3B illustrates a state where the attachment table 420 has retreated to a preparation position after the height control, and FIG. 3C illustrates a state where the transfer unit 100 starts transfer of an image.

In a case where an image is formed on the medium 500, first, the medium 500 held by the jig 423 is placed on the attachment table 420 at the transport start position of the medium attaching detaching unit 300. Then, the medium 500 is lowered to a height at which the medium 500 does not make contact with the intermediate transfer belt 131 of the transfer unit 100 by the height controller of the attachment table 420, and then the attachment table 420 on which the medium 500 is placed is moved to a position below the transfer position of the transfer unit 100.

Next, the height of the attachment table 420 is controlled so that the medium 500 makes contact with the intermediate transfer belt 131 with a strength appropriate for transfer of the image at the transfer position (arrow a in FIG. 3A). When the height is controlled, information on an appropriate height (hereinafter referred to as a "transfer execution height") thus obtained is held, for example, in the memory of the controller. Then, the attachment table 420 is lowered to a height where the medium 500 does not make contact with the intermediate transfer belt 131 and moves to the preparation position for transfer operation (arrow b in FIG. 3A).

When the attachment table 420 moves to the preparation position, the height of the attachment table 420 is adjusted to the transfer execution height on the basis of the information obtained in the height control. Then, the attachment table 420 moves to the transfer position (arrow c in FIG. 3B), and transfer of the image starts when the medium 500 makes contact with the intermediate transfer belt 131 at the transfer position (FIG. 3C).

Configuration of Fixing Unit 200

After the image is transferred onto the medium 500 in the transfer unit 100, the image is fixed in the fixing unit 200. In the present exemplary embodiment, an image is formed on any of the media 500 having various thicknesses and shapes, and therefore the fixing processing is performed by a non-contact-type device. The fixing unit 200 melts particles forming the image transferred onto the medium 500 by heating the particles and thereby fixes the particles on the surface of the medium 500.

Figure 4A:
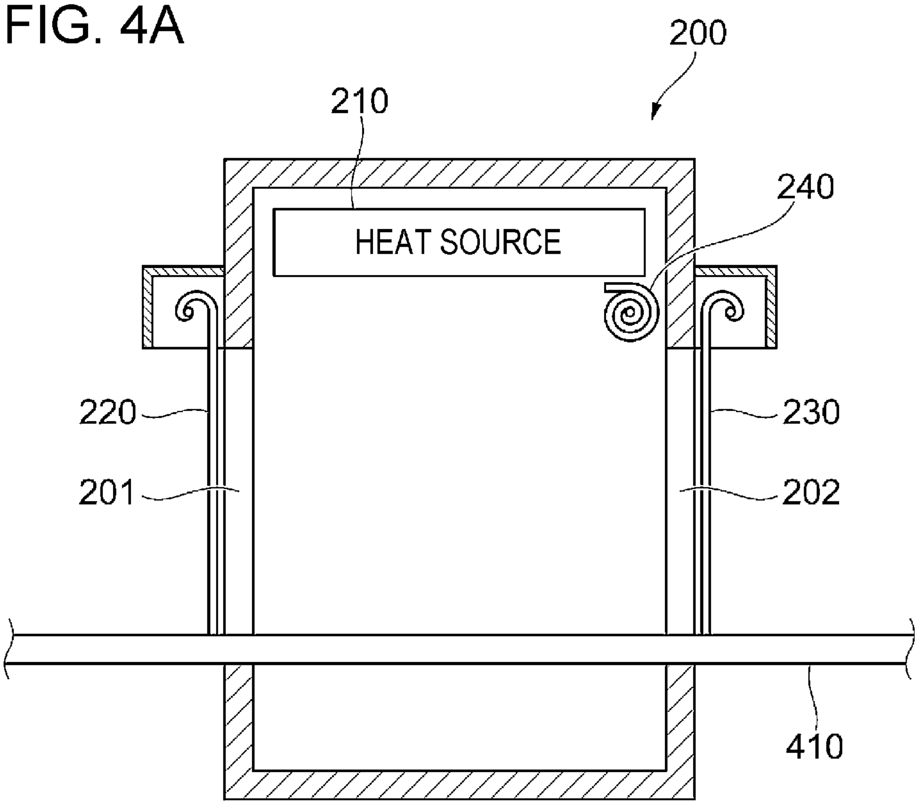
FIGS. 4A and 4B illustrate a configuration and operation of a fixing unit.
Figure 4B:
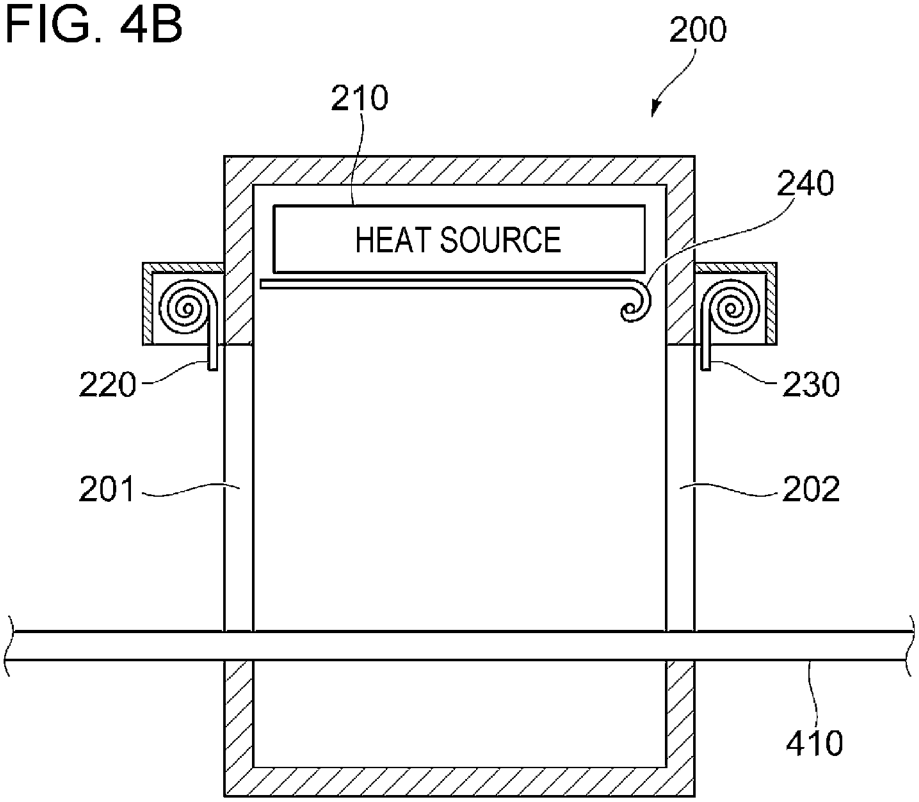

FIGS. 4A and 4B illustrate a configuration and operation of the fixing unit 200. FIG. 4A illustrates a state where openings of the fixing unit 200 are closed, and FIG. 4B illustrates a state where the openings of the fixing unit 200 are opened. The fixing unit 200 includes a carry-in opening 201, which is an opening through which the medium 500 is carried into the fixing unit 200, and a carry-out opening 202, which is an opening through which the medium 500 is carried out of the fixing unit 200. Furthermore, the carry-in opening 201 and the carry-out opening 202 of the fixing unit 200 according to the present exemplary embodiment are provided with an opening and closing member and are configured to be opened when the medium 500 is carried into or out of the fixing unit 200 and be closed when the fixing processing is performed.

In this example, an opening on a side where the medium 500 is carried into the fixing unit 200 when image fixing processing is performed by the fixing unit 200 is the carry-in opening 201, and an opening on a side where the medium 500 is carried out of the fixing unit 200 is the carry-out opening 202. In other words, an opening in a side surface that faces the transfer unit 100 is the carry-in opening 201, and an opening in a side surface that faces the medium attaching detaching unit 300 is the carry-out opening 202. In the example illustrated in FIGS. 4A and 4B, an opening on a left side is the carry-in opening 201, and an opening on a right side is the carry-out opening 202. In the image forming apparatus 10 according to the present exemplary embodiment, the medium 500 passes through the fixing unit 200 when the medium 500 is transported from the transport start position of the medium attaching detaching unit 300 to the transfer unit 100. In this case, the medium 500 enters the fixing unit 200 through the carry-out opening 202 and exits the fixing unit 200 through the carry-in opening 201, in a manner opposite to the case where the fixing processing is performed. However, in the present exemplary embodiment, the carry-in opening 201 and the carry-out opening 202 are set as described above on the basis of operation performed when the fixing processing is performed in the fixing unit 200.

The fixing unit 200 includes a heat source 210 for thermal fixation. The heat source 210 can be, for example, any of various existing heat sources such as a halogen lamp, a ceramic heater, and an infrared lamp. Instead of the heat source 210, a device that heats particles forming the image by emitting infrared laser may be used. The fixing unit 200 according to the present exemplary embodiment is provided with a member that can cover the heat source 210, and is configured so that the heat source 210 is exposed when the fixing processing is performed.

In the example illustrated in FIGS. 4A and 4B, roll-up shutters 220 and 230 are provided as the opening and closing members of the carry-in opening 201 and the carry-out opening 202. The shutters 220 and 230 are closed (see FIG.

4A) except when the medium 500 is carried into and out of the fixing unit 200 and thereby prevent a decrease in internal temperature. The shutter 220 of the carry-in opening 201 opens when the medium 500 is carried into the fixing unit 200, and the shutter 230 of the carry-out opening 202 opens when the medium 500 is carried out of the fixing unit 200 (see FIG. 4B).

In the example illustrated in FIGS. 4A and 4B, a roll-up shutter 240 is provided as the covering member that covers the heat source 210. The shutter 240 closes in a case where the shutter 220 of the carry-in opening 201 and/or the shutter 230 of the carry-out opening 202 open(s) (see FIG. 4B). This may keep a decrease in temperature of the heat source 210 small even in a case where the carry-in opening 201 and/or the carry-out opening 202 open(s) and the internal temperature decreases.

In the example illustrated in FIG. 4B, a state where both of the shutter 220 of the carry-in opening 201 and the shutter 230 of the carry-out opening 202 are opened is illustrated for convenience of description. In actual operation, the shutter 230 of the carry-out opening 202 remains closed when the medium 500 is carried into the fixing unit 200, and the shutter 220 of the carry-in opening 201 remains closed when the medium 500 is carried out of the fixing unit 200. This keeps a decrease in internal temperature small.

The shutters 220, 230, and 240 illustrated in FIGS. 4A and 4B are an example of the opening and closing members of the carry-in opening 201 and the carry-out opening 202 and the covering member of the heat source 210. The opening and closing members and covering member are not limited to the above configuration, as long as the opening and closing members and covering member keep a decrease in internal temperature of the fixing unit 200 and temperature of the heat source 210 small. For example, an opening and closing door may be provided instead of the shutters 220, 230, and 240 illustrated in FIGS. 4A and 4B. As the opening and closing member of the carry-out opening 202 through which the medium 500 passes after the fixing processing is finished, a curtain made of a heat insulating material or air curtain may be used to prevent leakage of internal air.

Transfer of Image onto Medium 500 Having Circumferential Surface

Figure 5A:
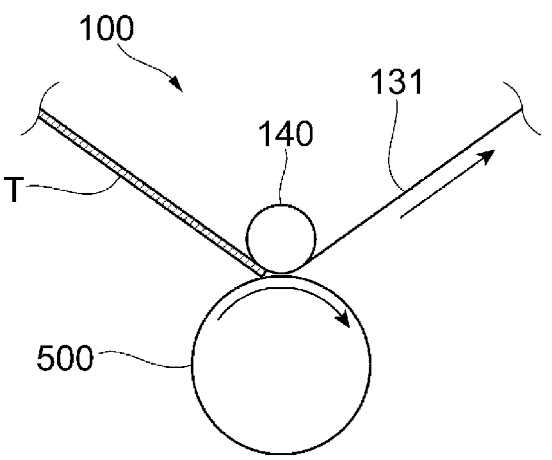
FIGS. 5A to 5C illustrate a method for transferring an image onto a medium having a circumferential surface.
Figure 5B:
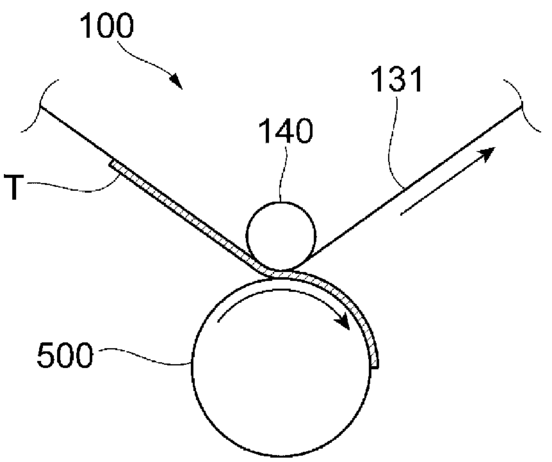
Figure 5C:
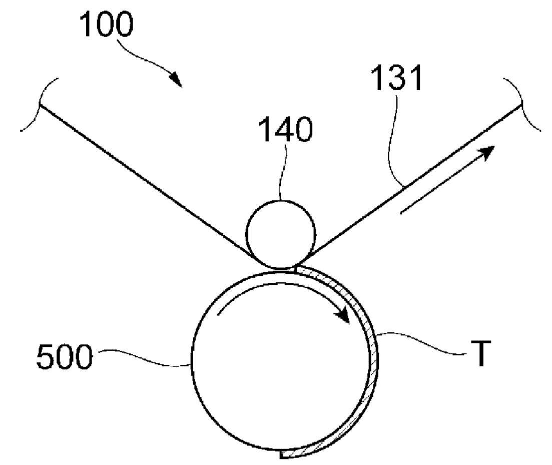

FIGS. 5A to 5C illustrate a method for transferring an image onto the medium 500 having a circumferential surface. FIG. 5A illustrates a state at the start of the transfer, FIG. 5B illustrates a state during the transfer, and FIG. 5C illustrates a state at the end of the transfer. In the example illustrated in FIGS. 5A to 5C, an image T is transferred onto a side surface of a cylindrical medium 500 over a half of a circumference in a circumferential direction.

To form the image T on the side surface that is the circumferential surface of the medium 500 along the circumferential direction, it is necessary to move a portion of the side surface of the medium 500 that makes contact with the intermediate transfer belt 131 of the transfer unit 100 as the intermediate transfer belt 131 moves while stopping the medium 500 at the transfer position of the transfer unit 100. For this purpose, the jig 423 holds the medium 500 so that a central axis of the circumferential surface of the medium 500 is orthogonal to the moving direction (hereinafter referred to as a "transfer direction") of the intermediate transfer belt 131 at the transfer position, and rotates the medium 500 about the central axis. A direction of rotation of the medium 500 is such a direction that movement of the circumferential surface matches the transfer direction of the intermediate transfer belt 131 at a position where the intermediate transfer belt 131 and the circumferential surface of the medium 500 make contact with each other. In the example illustrated in FIGS. 5A to 5C, the medium 500 is illustrated in such a posture that the central axis of the circumferential surface is perpendicular to the paper on which FIGS. 5A to 5C are drawn. The intermediate transfer belt 131 moves from left to right in FIGS. 5A to 5C, and the medium 500 rotates in a clockwise direction in FIGS. 5A to 5C (see the arrows in FIGS. 5A to 5C).

In a case where the transfer unit 100 transfers the image T onto the medium 500, first, the image T is formed on the intermediate transfer belt 131 by the developing devices 110 of the respective colors as the intermediate transfer belt 131 moves. Then, when the intermediate transfer belt 131 further moves and the image T formed on the intermediate transfer belt 131 reaches the transfer position, the image T is transferred from the intermediate transfer belt 131 onto the medium 500, as illustrated in FIG. 5A. When the intermediate transfer belt 131 further moves, the medium 500 rotates accordingly, and transfer of the image T is executed while the contact portion of the medium 500 moves along the circumferential direction. Accordingly, the image T on the intermediate transfer belt 131 is transferred onto the circumferential surface of the medium 500 along the circumferential direction, as illustrated in FIGS. 5B and 5C.

Configuration of Jig 423

Next, the jig 423 for the medium 500 having the circumferential surface is described. In the present exemplary embodiment, the jig 423 that rotates the medium 500 and continuously brings the circumferential surface of the medium 500 into contact with the intermediate transfer belt 131 of the transfer unit 100 along the circumferential direction is used, as described with reference to FIG. 5. A configuration of such a jig 423 is described below by giving specific examples.

Figure 6A:
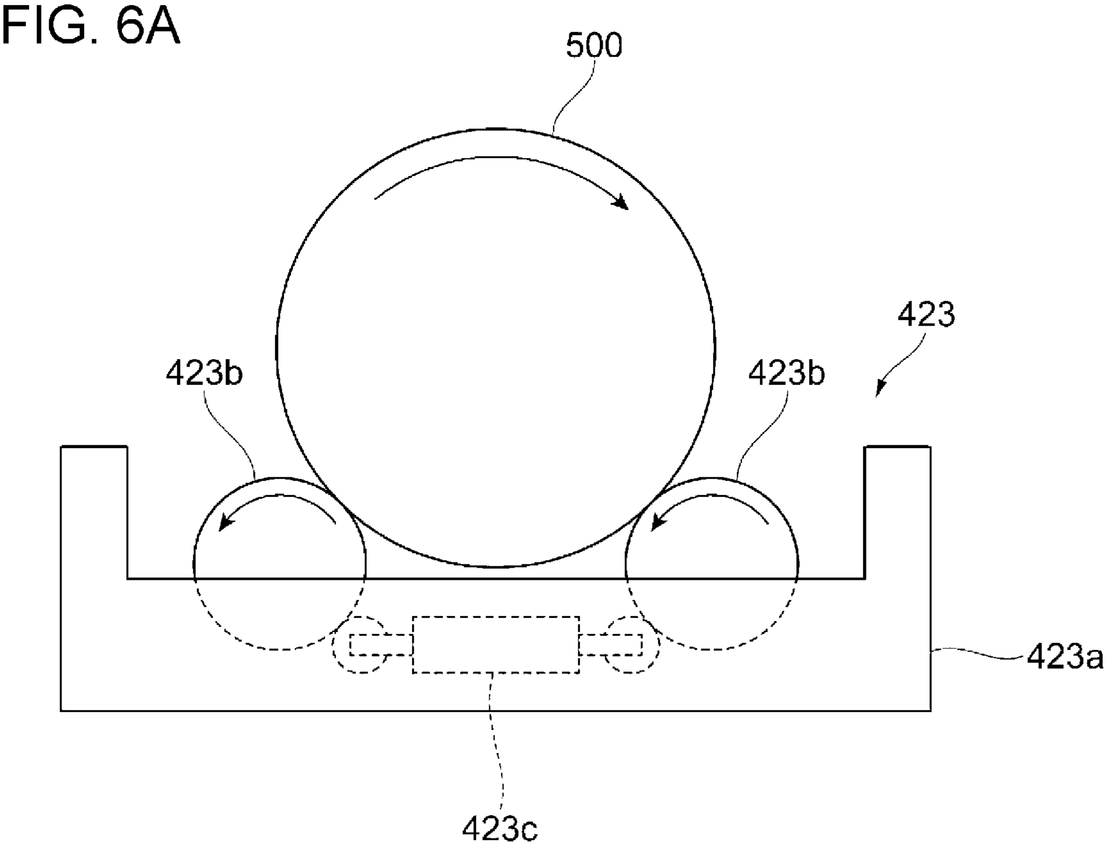
FIGS. 6A and 6B illustrate an example of a configuration of a jig that rotatably holds a medium.
Figure 6B:
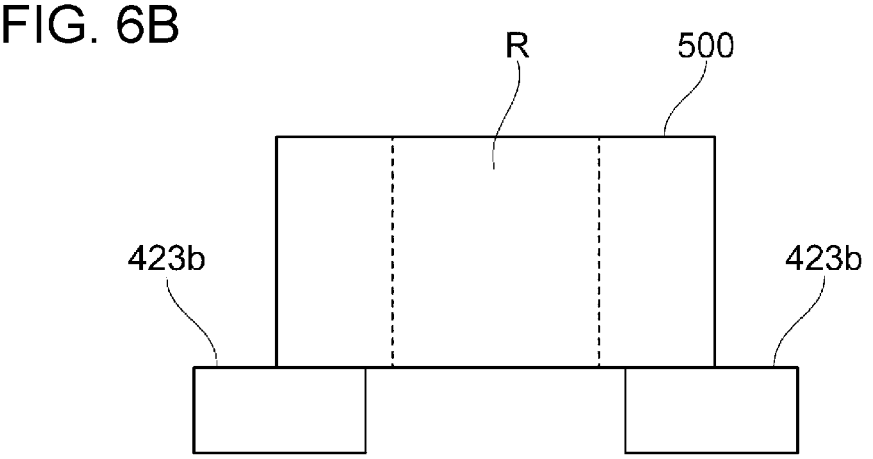

FIGS. 6A and 6B illustrate an example of a configuration of the jig 423 that rotatably holds the medium 500. FIG. 6A illustrates the jig 423 and the medium 500 viewed in a direction parallel with a rotary axis of the medium 500, and FIG. 6B illustrates a relationship between the medium 500 and rollers 423*b* of the jig 423 viewed in a direction perpendicular to the rotary axis of the medium 500. In FIG. 6B, only the medium 500 and the rollers 423*b* are illustrated. The jig 423 illustrated in FIG. 6A includes a base 423*a* and the rollers 423*b*. The base 423*a* includes a driving device 423*c* for rotating the rollers 423*b*. In the jig 423 illustrated in FIG. 6A, the base 423*a* has a structure that fits with the fastener of the table part 422 and is fixed to the table part 422.

The rollers 423*b* make contact with the circumferential surface of the medium 500 and rotatably supports the medium 500. The rollers 423*b* are disposed on the base 423*a* so that rotary axes thereof are orthogonal to the transfer direction of the intermediate transfer belt 131 and the medium 500 is placed on the rollers 423*b*. In the example illustrated in FIG. 6A, two rollers 423*b* are spaced apart from each other by an appropriate distance so that rotary axes thereof are parallel with each other, and the medium 500 is placed between the two rollers 423*b*. Although it seems that two rollers 423*b* are disposed in FIG. 6A, it is assumed that two rollers 423*b* are disposed for each of two rotary axes, as illustrated in FIG. 6B. A rotary surface of each of the rollers 423*b* is, for example, made of a member having a high coefficient of friction such as rubber.

The image forming apparatus 10 according to the present exemplary embodiment rotates the medium 500 at the transfer position when an image is formed on the medium 500, as described with reference to FIG. 5. Accordingly, in some cases, a portion of the circumferential surface of the medium 500 onto which the image has been transferred moves downward and reaches a position corresponding to the rollers 423*b* as the medium 500 rotates. An example of such cases is a case where an image is transferred over a half of the circumference or an entire circumference of the circumferential surface of the medium 500. In such a case, it is necessary to avoid contact between the image transferred onto the circumferential surface of the medium 500 and the rollers 423*b*. In view of this, the rollers 423*b* are configured to support the medium 500 in regions other than a region where an image is to be transferred on the circumferential surface of the medium 500.

In the example illustrated in FIG. 6B, a region R where an image is to be transferred is set in a central part of the circumferential surface of the medium 500 in a central axis direction. Two rollers 423*b* whose rotary axes match each other are disposed on both sides of the region R so as to support the medium 500 at positions that do not make contact with the region R. Note that the configuration illustrated in FIG. 6B is an example of a configuration in which the rollers 423*b* do not make contact with the region R of the medium 500, and shapes of the rollers 423*b* are not limited to the configuration illustrated in FIG. 6B. For example, a roller 423*b* whose portion corresponding to the region R is thinner than portions thereof on both sides and does not make contact with the region R may be used instead of disposing the plural rollers 423*b* as illustrated in FIG. 6B.

The driving device 423*c* is a driving unit for rotating the rollers 423*b*. The rollers 423*b* rotate by receiving power from the driving device 423*c* and thereby rotates the medium 500. Any of various existing mechanisms can be used as the driving device 423*c*, and a specific structure of the driving device 423*c* is not limited. For example, a motor and a driving roller that rotates by receiving power from the motor may be used, and rotation of the driving roller may be transmitted to the rollers 423*b* by bringing the driving roller into contact with the rollers 423*b*. The driving device 423*c* rotates the rollers 423*b* so that a rotation speed of the medium 500 rotated by the rollers 423*b* becomes equal to a moving speed of the intermediate transfer belt 131 at the contact position with the intermediate transfer belt 131 of the transfer unit 100.

Note that the configuration in which the driving device 423*c* is provided in the jig 423 and the jig 423 dynamically rotates the medium 500 in synchronization with action of the intermediate transfer belt 131 of the transfer unit 100 while using the rollers 423*b* as driving wheels has been described above. However, it is also possible to employ a configuration in which the jig 423 merely rotatably supports the medium 500 and the medium 500 rotates in accordance with action of the intermediate transfer belt 131 while the rollers 423*b* are used as driven wheels. For example, in a case where the medium 500 is made of a material having a high coefficient of friction with the intermediate transfer belt 131, the medium 500 is rotated without the need for driving by the rollers 423*b* by being pulled by the intermediate transfer belt 131 at the contact position.

Figure 7A:
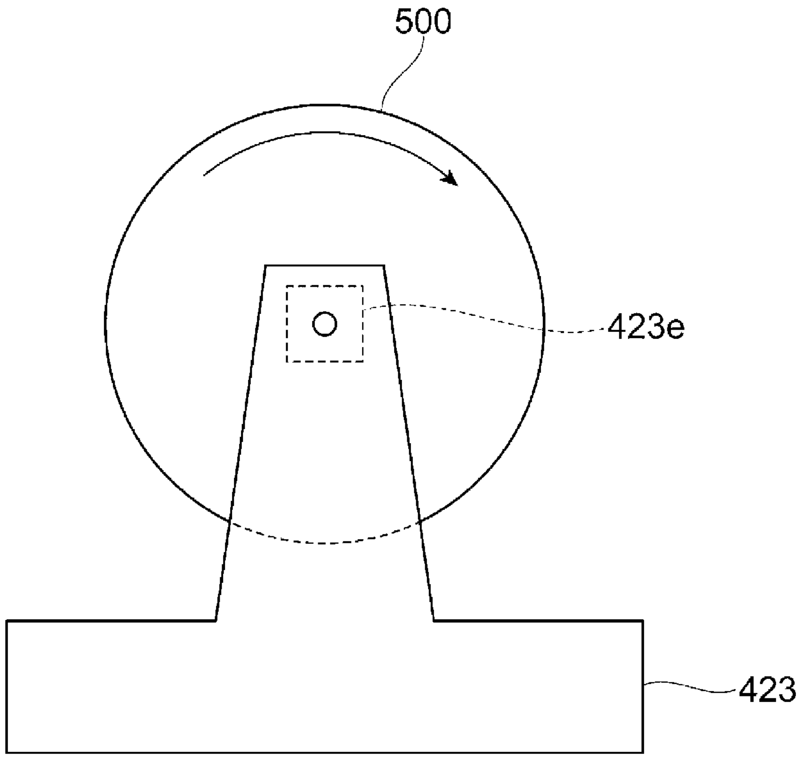
FIGS. 7A and 7B illustrate another example of a configuration of a jig that rotatably holds a medium.
Figure 7B:
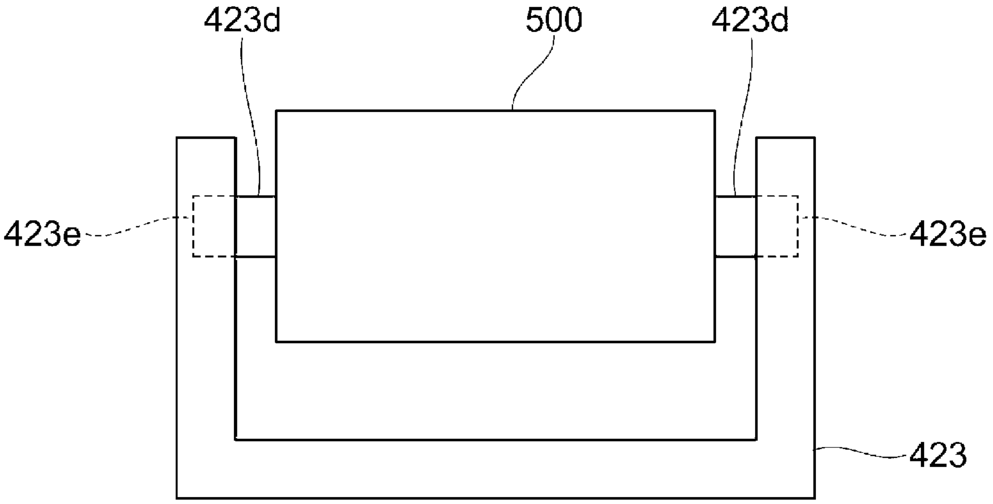

FIGS. 7A and 7B illustrate another example of the configuration of the jig 423 that rotatably holds the medium 500. FIG. 7A illustrates the jig 423 and the medium 500 viewed in a direction parallel with the rotary axis of the medium 500, and FIG. 7B illustrates the jig 423 and the medium 500 viewed in a direction perpendicular to the rotary axis of the medium 500. The jig 423 illustrated in FIGS. 7A and 7B supports the medium 500 so that the medium 500 is rotatable about the central axis of the circumferential surface of the medium 500. The jig 423 has fastening parts 423*d* that rotatably fasten the medium 500. The jig 423 includes a driving device 423*e* for rotating the medium 500. The jig 423 has a structure that fits with the fastener of the table part 422 and is fixed to the table part 422.

The jig 423 illustrated in FIGS. 7A and 7B fastens positions where the central axis of the circumferential surface of the medium 500 passes from both sides of the axis by using the fastening parts 423*d*. The driving device 423*e* is a driving unit for rotating the fastening parts 423*d*. The fastening parts 423*d* receives power from the driving device 423*e* and rotate the medium 500 about the central axis of the circumferential surface while fastening the medium 500. Any of various existing mechanisms can be used as the driving device 423*e*, and a specific structure of the driving device 423*e* is not limited. For example, the fastening parts 423*d* may be directly driven to rotate by a motor. The driving device 423*e* rotates the fastening parts 423*d* so that a rotation speed of the medium 500 becomes equal to a moving speed of the intermediate transfer belt 131 at the contact position with the intermediate transfer belt 131 of the transfer unit 100.

Note that the configuration in which the driving device 423*e* is provided in the jig 423 and the jig 423 dynamically rotates the medium 500 in synchronization with action of the intermediate transfer belt 131 of the transfer unit 100 while using the fastening parts 423*d* as driving wheels has been described. However, it is also possible to employ a configuration in which the jig 423 merely rotatably supports the medium 500 and the medium 500 rotates in accordance with action of the intermediate transfer belt 131 while the fastening parts 423*d* are used as driven wheels. For example, in a case where the medium 500 is made of a material having a high coefficient of friction with the intermediate transfer belt 131, the medium 500 is rotated without the need for driving by the fastening part 423*d* by being pulled by the intermediate transfer belt 131 at the contact position.

Since the jig 423 illustrated in FIGS. 7A and 7B rotates while fastening the central axis of the circumferential surface of the medium 500, media 500 having various shapes having a circumferential surface can be held by fastening the central axis of the circumferential surface. Furthermore, the jig 423 illustrated in FIGS. 7A and 7B can hold the medium 500 so that an image is transferred onto a circumferential surface of the medium 500 even in a case where the circumferential surface of the medium 500 has an uneven portion.

Figure 8A:
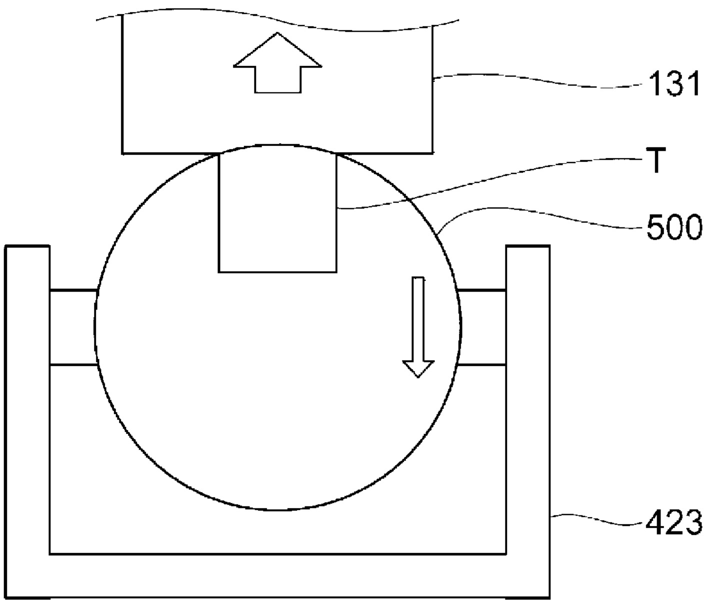
FIGS. 8A and 8B illustrate an example of the medium having a circumferential surface.
Figure 8B:
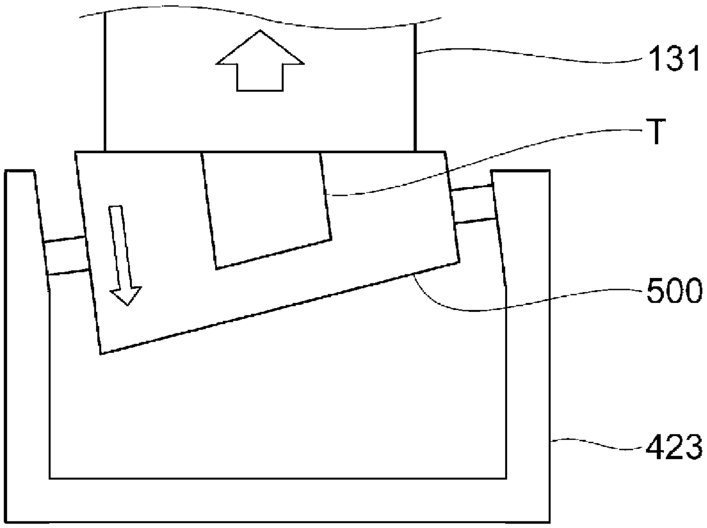

FIGS. 8A and 8B illustrate an example of the medium 500 having a circumferential surface. FIG. 8A illustrates a medium 500 having a spherical shape, and FIG. 8B illustrates a medium 500 having a truncated cone shape. FIGS. 8A and 8B illustrate the medium 500 viewed in a direction perpendicular to the rotary axis of the medium 500 from a front side in the transport direction in which the medium 500 is transported.

In a case where the medium 500 has a spherical shape, the circumferential surface is bulged not only in a circumferential direction, but also in a direction parallel with the central axis. Accordingly, an image is transferred onto a thin region where the medium 500 and the intermediate transfer belt 131 make contact with each other due to warpage of the intermediate transfer belt 131, as illustrated in FIG. 8A. However, an image of this width can be transferred over an entire circumference of the spherical medium 500. In FIG. 8A, a band-shaped image T is formed on a portion of the surface of the medium 500 that makes contact with the intermediate transfer belt 131.

In a case where the medium 500 has a truncated cone shape, the circumferential surface is inclined with respect to the central axis. In this case, as illustrated in FIG. 8B, the jig 423 holds the medium 500 by inclining the central axis in accordance with the inclination of the circumferential surface so that the circumferential surface of the medium 500 corresponds to a surface of the intermediate transfer belt 131 of the transfer unit 100. In FIG. 8B, an image T that is inclined with respect to the central axis of the circumferential surface is formed corresponding to the circumferential surface of the medium 500.

In the example illustrated in FIGS. 8A and 8B, image transfer in a case where the circumferential surface of the medium 500 has curvature also in a direction parallel with the central axis (FIG. 8A) and a case where the circumferential surface of the medium 500 is inclined with respect to the central axis (FIG. 8B) has been described. As described above, in a case where the jig 423 illustrated in FIGS. 7A and 7B is used, an image can be transferred onto media 500 having various circumferential surfaces. Furthermore, an image can be formed even on a medium 500 having a protruding portion on a circumferential surface thereof such as a glass with a handle by rotating the medium 500 within such a range that the protruding portion does not make contact with the intermediate transfer belt 131 and the jig 423 although the image can be transferred only onto a part of the circumferential surface.

Control of Movement of Medium 500 at Transfer Position

In a case where an image is transferred onto a circumferential surface of the medium 500 in the transfer unit 100, the medium 500 itself needs to stop at the transfer position while the image is being transferred although the medium 500 is rotated in synchronization with movement of the intermediate transfer belt 131 of the transfer unit 100, as described above. One example of a method for stopping movement of the medium 500 during transfer of an image is that the transport mechanism 400 stops transport of the attachment table 420 on which the medium 500 is placed when the medium 500 moves to the transfer position. Another example of the method is that the position of the medium 500 relative to the transfer position of the transfer unit 100 is stopped by moving the jig 423 relative to the table part 422 of the attachment table 420 in a direction opposite to the direction in which the attachment table 420 is transported.

In the configuration described with reference to FIG. 2, the jig 423 is fixed to the attachment table 420 with the use of the fastener provided on the table part 422. On the other hand, in a case where the jig 423 is moved relative to the table part 422, the table part 422 is provided with a movement path, and the jig 423 has a unit for movement that moves along the movement path. The movement path of the table part 422 and the unit for movement of the jig 423 are not limited to a specific configuration, provided that the jig 423 can move along a predetermined movement path. One example is a configuration in which the table part 422 is provided with a groove or a rail as the movement path and the jig 423 has, as the unit for movement, a wheel for travelling in the groove or on the rail. More specifically, a rack and pinion in which a rack is used as a rail of the movement path and a pinion gear is used as a wheel of the jig 423 may be used, and the jig 423 may be moved by controlling rotation of the pinion gear of the jig 423. The jig 423 may be provided with a driving unit such as a motor, and the jig 423 may travel on its own on the movement path of the table part 422. Alternatively, the movement path of the table part 422 may be provided with a unit for pulling the jig 423.

The movement path is provided parallel with the transport direction in which the attachment table 420 is transported. The jig 423 is movable only in a direction along the movement path, and movement thereof in a width direction of the movement path is restricted. Furthermore, in a case where the jig 423 is moved relative to the table part 422, the movement path needs to be long enough for the jig 423 to move while an image is being transferred onto the medium 500. This leads to an increase in size of the table part 422 relative to the jig 423 as compared with a configuration in which the jig 423 is fixed to the table part 422 such as the configuration described with reference to FIG. 2.

Figure 9A:
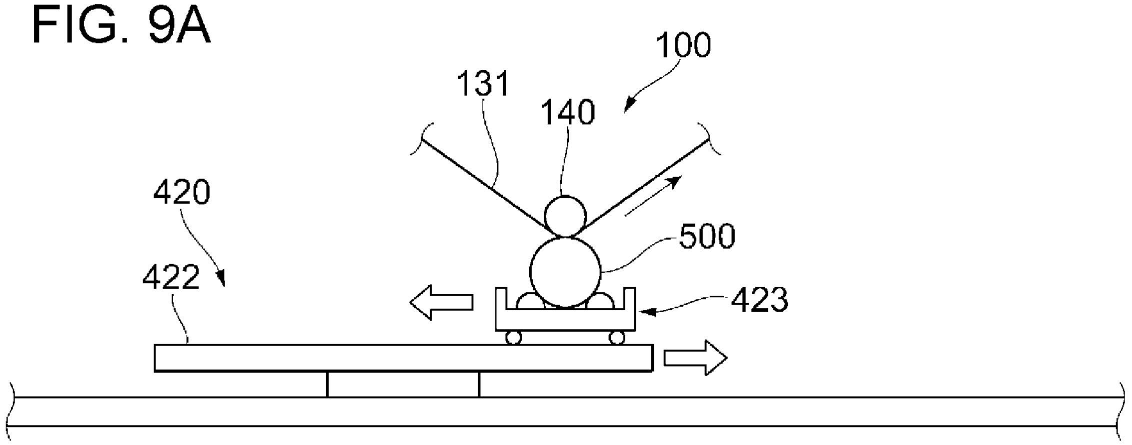
FIGS. 9A to 9C illustrate movement of the jig.
Figure 9B:
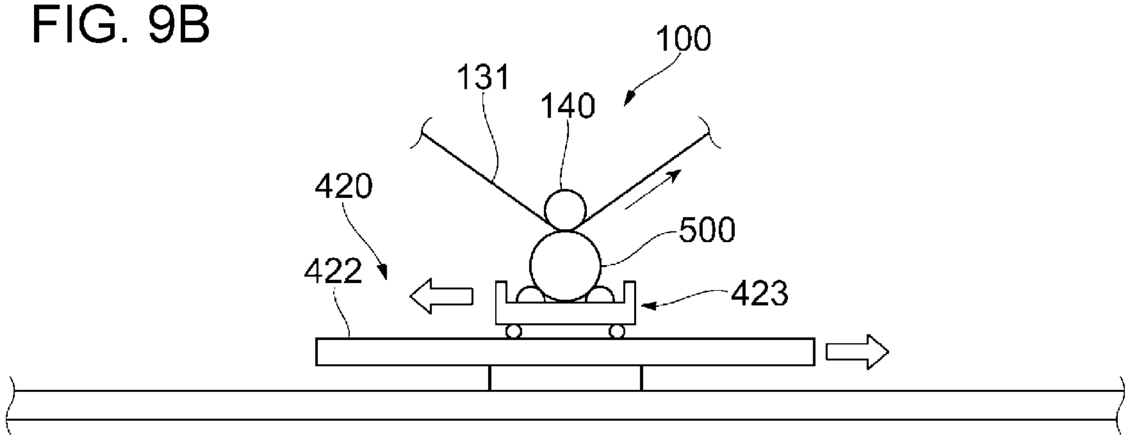
Figure 9C:
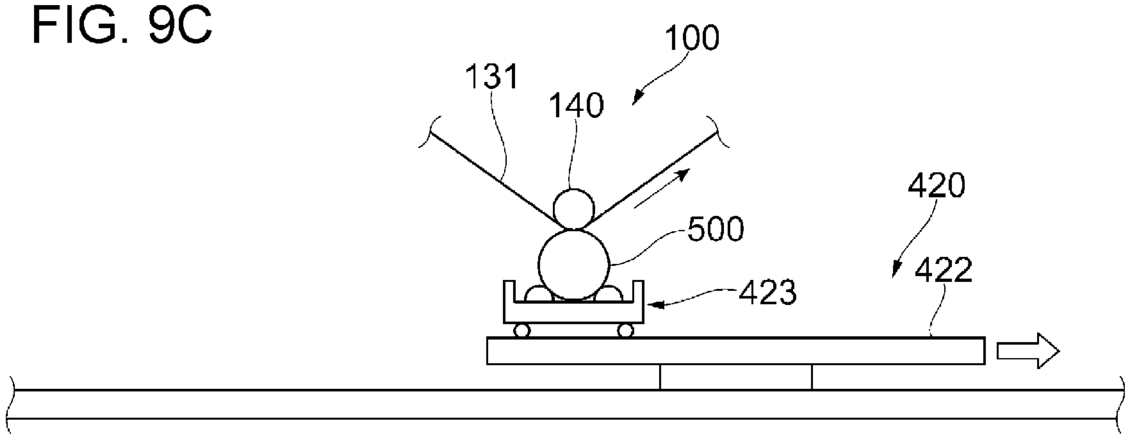

FIGS. 9A to 9C illustrate movement of the jig 423. FIG. 9A illustrates a state at the start of transfer, FIG. 9B illustrates a state during the transfer, and FIG. 9C illustrates a state at the end of the transfer. In a case where an image is transferred by the transfer unit 100, when the medium 500 reaches the transfer position as a result of transport of the attachment table 420, the jig 423 starts moving on the table part 422 in a direction opposite to the transport direction in which the attachment table 420 is transported, as illustrated in FIG. 9A. The jig 423 moves on the table part 422 and keeps the medium 500 at the transfer position as illustrated in FIG. 9B as the image is transferred onto the medium 500. After the transfer of the image onto the medium 500 ends, the movement of the jig 423 ends, and the medium 500 is transported toward the fixing unit 200 together with the attachment table 420, as illustrated in FIG. 9C.

The unit for movement of the jig 423 is controlled in terms of timings of start and end of movement of the jig 423 and a movement speed. Specifically, the unit for movement of the jig 423 is controlled so as to start movement of the jig 423 at a timing at which the medium 500 reaches the transfer position as a result of transport of the attachment table 420, move the jig 423 at a same speed as a transport speed of the attachment table 420 in a direction opposite to the transport direction in which the attachment table 420 is transported, and stop movement of the jig 423 at a timing at which transfer of an image onto the medium 500 ends. A controller is, for example, realized by a processor that controls operation of the driving unit of the jig 423 and a memory in which a control program to be executed by the processor and control data are stored. The controller may be mounted in the jig 423 or operation of the jig 423 may be controlled by an external control device. In the latter case, it is necessary to provide a signal path, for example, by connecting a signal cable to the jig 423 in order to transmit a control signal to the driving unit of the jig 423 during transport of the attachment table 420. The positions of the medium 500 and the jig 423 may be, for example, specified on the basis of a detection signal of a sensor provided in a housing of the image forming apparatus 10 or may be, for example, calculated on the basis of the position of the attachment table 420 on the transport rail 410. The position of the attachment table 420 on the transport rail 410 can be specified from information used for transport control in the transport mechanism 400. Furthermore, a length of the movement path of the table part 422 may be set to such a length that after start of movement of the jig 423, the jig 423 reaches an end on a side where the movement ends at a timing of end of transfer of an image onto the medium 500.

Although the exemplary embodiment of the present disclosure has been described, the technical scope of the present disclosure is not limited to the above exemplary embodiment. For example, the mechanism for moving the medium 500 and the mechanism for moving the jig 423 relative to the table part 422 are not limited to those described in the above exemplary embodiment and can have various configurations according to kind and shape of the medium 500. Various changes and substitution of the configurations are encompassed within the present disclosure without departing from the scope of the technical idea of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus including: a transfer unit that transfers an image onto an object by making contact with the object; a holding unit that holds the object having a circumferential surface so that the circumferential surface rotates along a transfer direction of the transfer unit; and a transport unit that transports the holding unit holding the object along a transport path, wherein the transfer unit transfers an image onto the circumferential surface of the object in a circumferential direction as the object rotates by making contact with the circumferential surface of the object maintained at a transfer position.

(((2)))

The image forming apparatus according to (((1))), wherein the holding unit further includes a mobile table part that is moved along the transport path by the transport unit and a support part that is provided on the mobile table part so as to be movable in a direction opposite to the transport direction of the transport unit and rotatably supports the object.

(((3)))

The image forming apparatus according to (((2))), wherein the holding unit further includes a driving mechanism that moves the support part relative to the mobile table part at a same speed as a transport speed of the transport unit in the direction opposite to the transport direction of the transport unit.

(((4)))

The image forming apparatus according to any one of (((1))) to (((3))), wherein the holding unit includes a support table that supports the object placed thereon; and the support table is provided with a roller that has a rotary axis substantially orthogonal to the transport direction of the transport unit and supports the circumferential surface of the object.

(((5)))

The image forming apparatus according to (((4))), wherein the roller of the support table is provided so as to support the object in a region of the object other than an image region where an image is to be transferred.

(((6)))

The image forming apparatus according to (((4))) or (((5))), wherein the support table includes a driving unit that rotates the roller so that the object rotates at a speed corresponding to a transfer speed at which an image is transferred by the transfer unit.

(((7)))

The image forming apparatus according to any one of (((1))) to (((3))), wherein the holding unit includes a pivotally-supporting part that supports the object so that the object is rotatable about a central axis of the circumferential surface of the object including an image region where an image is to be transferred.

(((8)))

The image forming apparatus according to (((7))), further including a driving unit that drives the pivotally-supporting part so that the object rotates at a speed corresponding to a transfer speed at which an image is transferred by the transfer unit.

What is claimed is:

1. An image forming apparatus comprising:

a transfer unit that transfers an image onto an object by making contact with the object;

a holding unit that holds the object having a circumferential surface so that the circumferential surface rotates along a transfer direction of the transfer unit; and a transport unit that transports the holding unit holding the object along a transport path, wherein the transfer unit transfers an image onto the circumferential surface of the object in a circumferential direction as the object rotates, by making contact with the circumferential surface of the object maintained at a transfer position, wherein the holding unit further includes a mobile table part that is moved along the transport path by the transport unit and a support part that is provided on the mobile table part so as to be movable in a direction opposite to the transport direction of the transport unit and rotatably supports the object.

2. The image forming apparatus according to claim 1, wherein:

the holding unit further includes a driving mechanism that moves the support part relative to the mobile table part at a same speed as a transport speed of the transport unit in the direction opposite to the transport direction of the transport unit.

3. The image forming apparatus according to claim 1, wherein:

the holding unit includes a pivotally-supporting part that rotatably supports the object so that the object is rotatable about a central axis of the circumferential surface of the object including an image region where an image is to be transferred.

4. The image forming apparatus according to claim 3, further comprising a driving unit that drives the pivotally-supporting part so that the object rotates at a speed corresponding to a transfer speed at which an image is transferred by the transfer unit.

5. An image forming apparatus comprising:

a transfer unit that transfers an image onto an object by making contact with the object;

a holding unit that holds the object having a circumferential surface so that the circumferential surface rotates along a transfer direction of the transfer unit; and a transport unit that transports the holding unit holding the object along a transport path, wherein the transfer unit transfers an image onto the circumferential surface of the object in a circumferential direction as the object rotates, by making contact with the circumferential surface of the object maintained at a transfer position, wherein the holding unit includes a support table that supports the object placed thereon; and the support table is provided with a roller that has a rotary axis substantially orthogonal to the transport direction of the transport unit and supports the circumferential surface of the object.

6. The image forming apparatus according to claim 5, wherein:

the roller of the support table is provided so as to support the object in a region of the object other than an image region where an image is to be transferred.

7. The image forming apparatus according to claim 5, wherein:

the support table includes a driving unit that rotates the roller so that the object rotates at a speed corresponding to a transfer speed at which an image is transferred by the transfer unit.

8. An image forming apparatus comprising:

transfer means for transferring an image onto an object by making contact with the object;

holding means for holding the object having a circumferential surface so that the circumferential surface rotates along a transfer direction of the transfer means; and transport means for transporting the holding means holding the object along a transport path, wherein the transfer means transfers an image onto the circumferential surface of the object in a circumferential direction as the object rotates by making contact with the circumferential surface of the object maintained at a transfer position, wherein the holding means further includes a mobile table part that is moved along the transport path by the transport means and a support part that is provided on the mobile table part so as to be movable in a direction opposite to the transport direction of the transport means and rotatably supports the object.

* * * * *